United States Patent Office 2,768,909
Patented Oct. 30, 1956

2,768,909

METHOD OF COATING SURFACE WITH TRANSPARENT FILM AND PRODUCT RESULTING THEREFROM

John H. Haslam, Wilmington, Del., assignor to E. I. du Pont de Nemours and Company, Wilmington, Del., a corporation of Delaware No Drawing. Application July 28, 1953,
Serial No. 370,871

9 Claims. (Cl. 117—121)

This invention relates to novel adhesive coatings and films and to their use in providing decorative and protective coatings on a wide variety of materials. More particularly it pertains to thin, adherent, transparent supported films of the polyoxides of the group IV–A metals. These films are especially useful in bonding other protective and decorative coatings to metals, glass, plastic objects and fibers, ceramics, masonry, and other surfaces and objects.

This application is a continuation-in-part of my copending application Serial No. 79,921, filed March 5, 1949, now abandoned.

Numerous previous attempts have been made to produce protective films of a primarily inorganic nature by steps involving the hydrolysis of organic esters of certain metals or metalloids. Thus, coatings from hydrolyzed silicon esters have been made but these esters hydrolyze so slowly that, for practical purposes, it is necessary to promote the hydrolysis with strong acids such as hydrochloric acid. Obviously, this acidity has seriously limited the use of such coatings to such surfaces as masonry, etc. The esters of titanium and zirconium are known to hydrolyze in moist air, and various investigators have attempted to prepare films or coatings of a less corrosive nature from these esters. However, such prior attempts have resulted in films or coatings which are unstable and undesirably brittle, non-adherent, and tend to objectionably flake off. In addition, there was thought to be room for considerable improvement over the known silicate films because of rather poor adhesion and resistance to mechanical shock.

It is an object of this invention to overcome these and other disadvantages characterizing prior coatings and adhesives, and to provide novel transparent, adherent, thermally stable, flexible supported films of a mainly inorganic content suitable for use as coatings or bonding agents in a wide variety of applications and surfaces. A further object is to provide an improved method of applying a Fourth Group metal ester or mixtures thereof so as to obtain a novel form of film. A still further object is to obtain an improved cohesive, transparent film from simple compositions of the relatively cheap, lower-alcohol esters of titanium, zirconium, etc. A further particular object is to provide stable, film-forming compositions of titanium esters which are relatively easy and inexpensive to prepare and adapted to be readily applied to and retained upon a surface to be decorated or protected. Other objects and advantages of the invention will be apparent from the ensuing description.

These and other objects are attained by this invention which comprises coating the surface of a solid form of material with a water- and organic-solvent-insoluble, transparent, flexible, adherent, polymeric oxide film of not more than one micron thickness, by applying to said surface a layer of a hydrolyzable organic ester, containing from 1 to 8 carbon atoms per organic radical, of a group IV–A metal (titanium, zirconium, and hafnium) containing from about .0003 to .0375 gram molecule of the ester per square meter of said surface, and contacting the applied ester layer, while having present therein not more than a minor amount of a volatile solvent for said ester, with water vapor until substantial hydrolysis and polymerization of the ester on said surface is effected.

In a more specific and preferred embodiment, the invention comprises forming a non-aqueous solution not more than 0.525 molar, and preferably from 0.01 to 0.3 molar, of a low-molecular-weight monohydroxy alcohol ester having the formula $(RO)_4M$, wherein R is an alkyl radical containing from 1 to 8 carbon atoms and M is a group IV–A metal, especially titanium or zirconium, in a relatively volatile, anhydrous organic solvent, applying said solution as a coating to a supporting surface, and drying and hardening said coating on said surface to a clear, transparent and flexible film of not more than one micron thickness and insoluble in water and all common organic solvents by (1) evaporation of the solvent and (2) hydrolysis and polymerization of the metal ester by contacting the ester film with an atmosphere containing water vapor.

The improved films which result from this invention occur from proper control of two sets of interrelated and dependent factors: (1) the nature and concentration of the ester solution used, and (2) the conditions which exist during removal of the solvent from the film and hydrolysis of the residual ester. In coating a given surface with a film, one naturally assumes that the more concentrated the solids content of the coating solution, the more advantageous will be its film-forming characteristics; also, the more cohesive and adherent will be such film.

I have found that the amount of oxide residue, however, is quite critical in forming the desired film. Films thicker than about one micron begin to lose their transparency, cohesive and adhesive properties. Film thickness in this range is not too readily determined and as an alternative control I find that depositing from 0.0003 to 0.0375 gram molecule of the ester per square meter of surface will result, after hydrolysis and polymerization, in my novel film. Amounts of ester in this range can be conveniently placed on the surface by application of an anhydrous solution in a volatile solvent containing from about 0.05 to 0.525 gram molecule per liter.

Although application of the esters while dissolved in volatile organic solvent is most useful, the invention is not limited thereto. The undiluted ester can be sprayed or wiped onto the surface to give the proper ratio of ester to surface area. Another method especially adaptable for treating glass articles, such as lenses, prisms or ornamental pieces, comprises making controlled application of the ester thereto by suitable evaporation and condensation procedures.

Esters contemplated for use in the invention comprise those of the group IV–A metals and the lower monohydric alcohols. Alkyl titanates such as propyl titanate, isopropyl titanate, butyl titanate, tertiary butyl titanate, etc., and parallel alkyl zirconates or mixtures thereof are especially useful. Similarly, the corresponding hafnium and thorium esters are also contemplated for use. Any of these monohydric alcohol esters from methyl to octyl can be used successfully, since all are readily hydrolyzed and the resulting alcohol can be evaporated, to leave the desired substantially inorganic polyoxide film upon the surface being coated. Likewise, the esters of chloroalcohols are also useful. Such esters can be prepared by a number of well-known methods of which the following equations are illustrative:

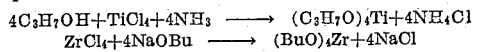

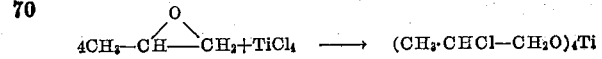

When the metal esters are to be applied to a surface from solution they are dissolved in a suitable anhydrous organic solvent in concentration up to about 0.5 mole. Suitable solvents include the hydrocarbons, such as hexane, cyclohexane, mineral spirits, benzene, toluene, xylene and others. Solvents of relatively low volatility can be used when the hydrolysis and curing or hardening steps are to be carried out at elevated temperatures. The volatile anhydrous alcohols can also be used and it is often preferable to use the alcohol corresponding with that in the metal ester used although not necessary. This ester-containing solution is then suitably brushed upon or otherwise applied in the form of a relatively thin layer or coating to the surface or structure to be coated, or, if preferred, can be applied thereto by dipping the structure therein or by spraying or drawing down the solution thereon with a doctor blade or by various other mechanical means. After application, the solution is suitably dried and hardened upon the surface or structure in the form of a thin, continuous and closely adhering film by drying under conditions of temperature and humidity which will induce gradual evaporation of the organic solvent from the solution and slow hydrolysis in situ of the titanium ester due to moisture contact from the atmosphere. Aging or heating may then be employed to further condense and harden the polyoxide film.

An unusual feature of this invention is the large variety of uses and applications to which these novel films can be put. It will be found that successful coatings on an amazing variety of entirely different substances can be effected. As noted, my novel films are clear and transparent, and are flexible and adherent in nature on both porous and non-porous surfaces. In addition, they are, upon hardening, generally insoluble in common solvents, both organic and water. Hence, they are particularly useful as primers on glass, paint, metal, ceramics, polyamides, cellulosic films, and other plastics including fibers and sheets, to increase the adhesion to smooth surfaces of subsequent applications of enamels, glass, paint, plastic, rubber, or the like; are valuable as top coatings for high gloss enamels and plastics to protect such surfaces from scratching and deterioration; give a high reflectance, yet are not themselves colored; and may be employed to protect optical lenses and other glass articles from scratching and chipping, or for bonding safety glass. Additionally, they are valuable and useful for protecting photographic film and other plastics; as coatings for transparent, flexible sheeting material, such as cellophane and similar packaging materials, where the films not only protect the material from splitting, but also, by their high ultra-violet absorption, afford protection of the contents of the package from the deleterious action of sunlight; for coating glass fibers and artificial fibers and bristles including those of nylon. Their corrosion or erosion resistance renders them further valuable for protecting metal surfaces, such as copper or brass, steel, aluminum, silver, and the like.

The novel film products of this invention comprise a clear, flexible, adherent, supported film, suitable as a protective coating and as an adhesion-promoting coat comprising the in-situ hydrolysis product resulting from the water vapor hydrolysis of a supported film containing an ester of a group IV-A metal, of the type referred to, and said in-situ hydrolysis product being substantially insoluble in the common organic solvents and containing not more than 1 of the original R groups per metal atom, and not more than 1 micron in thickness. These films appear to be initially sometimes hydrophilic, but no longer aging in moist air or by accelerated hydrolysis at elevated temperatures can become hydrophobic. It is believed that on initial hydrolysis the alkoxy groups are replaced by hydroxyl groups which, upon aging, interact with the elimination of water to form the polyoxide film. It appears, therefore, that when numerous hydroxyl groups are still present in the film it has hydrophilic properties, but when condensation and further polymerization are brought about by heat or aging, the film becomes more and more hydrophobic. This phenomenon makes it possible to control the wetting characteristics of this new film to enhance its properties as an undercoater for the subsequent application of other coatings, especially paints. Apparently in some instances a small residue of unhydrolyzed organic groups remains in the film. However, for the purposes of producing the film, as herein described, it is preferable that not more than one such unhydrolyzed organic group per titanium atom remain in the film.

To a clearer understanding of the invention, the following examples are given. These are merely in illustration but not in limitation of the underlying scope of the invention.

Example I

An ethyl titanate solution comprising 1.0% by weight of the ester and 99.0% by weight of ethanol was prepared by dissolving the titanate at room temperature in the solvent. The solution thus obtained was sprayed onto a stainless steel sheet and was then air-dried for 40 hours, the relative humidity during this time being about 50%. A thin, clear, transparent film resulted upon the sheet, which film was extremely hard and adherent to the steel and could not be removed therefrom even by rubbing with a solvent-soaked rag.

Example II

Tetrabutyl titanate was sprayed onto a sheet of cellophane using dry air as the spray medium. The spraying rate was adjusted to place from 0.5 to 0.8 gram of the ester on each square meter of cellophane surface. The sheet was then exposed to atmosphere at about 35% relative humidity for two hours. The product obtained was flexible and transparent and could be creased without causing separation. The cellophane thus coated could then be coated with resins or other polymeric substance such as nitrocellulose to yield an improved transparent, strongly bonded laminate.

Example III

One hundred fifty grams of 2-ethyl hexyl titanate was dissolved in enough dry xylene to give one liter of a film-forming solution. A clean glass panel was coated with this solution and then air-dried in a closed chamber wherein the relative humidity was maintained at 25% and the temperature at 25° C. for one-half hour. At the end of this period, the film then appearing dry, the temperature in the chamber was raised to 400° C. and drying of the film was effected at this temperature for one hour. The resulting film, which was found to adhere closely to the glass, was also found to be insoluble, hard, and transparent in character.

Example IV

Small squares (2 x 2 inch) of aluminum foil carrying corner tabs were dipped into a .1 molar solution of tetrabutyl titanate in butanol. The dipped sheets were hung in air at 30° C., 33% relative humidity, for 2 hours and then baked at 200° C. for 1 hour. These film-coated foil squares were then interleaved with polyethylene sheets and hot pressed at a temperature near the softening point of the polymer. The corner tabs were then electrically connected and the laminate used as a condenser. The good bond obtained between metal and insulating plastic due to the polytitanate film enhanced the ruggedness and utility of the article.

As indicated, the films resulting from drying of specific solutions of metal esters, in accordance with this invention, are clear, adherent, continuous and insoluble in all of the usual solvent liquids, including those from which the films are dried, in contrast to the opaque, non-adherent and discontinuous, thick films of the prior art. In general, my ester solutions can be as low as 0.05 molar and range up to not to exceed .55 molar in concentration, with preferred optimum concentrations ranging from .1 to .3 molar. The thickness of the film or coating up to one micron can be conveniently regulated by increasing the viscosity of the solution or by applying more material to the surface being coated, such as by increasing the ester content of the solution. Thus, when formation of relatively thin films, such as less than .25 micron in thickness, upon evaporation and drying is desired, resort to solutions having an ester content conforming to the lower limits of the indicated range can be resorted to, whereas formation of thicker films can be had through the employment of higher amounts of ester and within the upper portions of the above range. When using such higher concentrations, care must be exercised in the drying operation so that formation of the desired continuous, adherent film will be obtained. It is also possible to prepare relatively thick deposits of these polyoxide films by a multiple application of the process of this invention. Such a coating is thus prepared in layers, each layer being laid down by the steps of application and hydrolysis before the succeeding film is applied. Each successive layer in this method will be less than about 1 micron thickness. The solvent used should have a substantial vapor pressure within the range of 10°–100° C. which temperature can be readily provided under plant conditions and control of the solvent evaporation rate can be easily effected by regulating the temperature employed or utilizing a lower boiling type of solvent, all of which affords a much desired flexibility of operation. While certain common types of anhydrous forms of organic solvents, including those of ethanol, butanol, benzene, toluene, etc., have been suggested as utilizable herein, it will be obvious that other types, including higher boiling solvents, such as turpentine mineral spirits or octanol-2 can also be employed, although less desirable due to the fact that they require longer drying times and tend to leave a small, non-volatile residue upon drying.

Although non-aqueous solvents have been referred to as most useful in the invention, it is obvious that if 95% ethanol is employed, the water content of the alcohol will react with a portion of the ester and a partially hydrolyzed or polymerized solution will be obtained. A limited amount of water may be present in the solvent at the time of the preparation of the solution or may be added afterwards but it will be found advantageous to avoid the admission of substantial amounts of water prior to the formation of the film. Only small amounts can be tolerated since equivalent quantities will convert the ester to a titania gel and the desired films cannot be made therefrom. The reactivity of moisture with the ester renders the solution anhydrous and it is in this anhydrous state that the solution is used.

As noted above, the titanium and zirconium esters particularly utilizable herein comprise those of the simpler alcohols containing only 1 hydroxyl group and are capable of hydrolysis in the presence of water. They are characterized by the formula $(RO)_4M$, wherein R is an alkyl radical containing up to 8 carbon atoms and preferably from 2–8 carbon atoms. They can be prepared by interacting the tetrachloride of the metal in the presence of tertiary amines or ammonia with an alkyl monohydroxy alcohol, examples of which include ethyl, propyl (normal or iso), butyl (normal, iso, secondary or tertiary), amyl hexyl, heptyl, or octyl alcohols, or by direct interaction with the sodium alcoholates. Any of these monohydroxy alcohols yield titanium and zirconium esters adapted to react with moisture to give an insoluble film. The ester film or layer itself may be deposited by the evaporation of the solvent but the hydrolysis to the thin, clear, stable, polyoxide film results from the reaction of the ester with moisture vapor such as may be supplied by the atmosphere. Accordingly, the moisture content of the air will determine to some extent the character of the film and it is desirable that the hydrolysis not take place too rapidly, particularly when a thick film is to be produced. When the moisture content of the air is high, it is well to use a hydrocarbon as a solvent since this inhibits the absorption of moisture due to its hydrophobic properties. On the other hand, when the moisture content of the air is low, a more hydrophilic solvent such as butanol or isopropyl alcohol can be employed. It is therefore possible by selection of solvents and conditions for the drying of the film to provide the best conditions for rapidly obtaining titanium oxide films of the desired flexible properties, such flexibility being especially desirable when the coating is being made on thin metal sheets, cellophane and the like. The various metal esters ranging from, say, isopropyl to octyl vary considerably in their hydrolysis rate. Generally, the esters of higher-molecular-weight alcohols hydrolyze more slowly. As a consequence of this fact, one may, in carrying out this invention, select metal esters of such hydrolysis characteristics that optimum film-forming results may be obtained under almost any conditions of humidity.

The conditions under which hydrolysis of any given metal ester is effected must also be carefully controlled and correlated with the composition of the film-forming composition. That is, humidity, temperature, film thickness, type of ester, and similar considerations must be balanced. For example, if the film is to be simply air-dried under atmospheric conditions, a lesser concentration of ester or an ester of a higher alcohol should be employed on a rainy day when the relative humidity is high than on a clear day. Generally, it will be found better to use the film-forming compositions according to this invention which will react best toward the ambient relative humidity. Preferably, the hydrolysis is effectuated after substantially all the solvent has evaporated, and the rate of such hydrolysis should be slow. Film thickness also has a bearing on the hydrolysis rate, and such thickness, as already noted, may depend upon the concentration of the film-forming solution. In commercial operation, it is generally preferable to prepare these hydrolyzed films in an air conditioned room where the humidity can be controlled. This is also advantageous since it permits recovery and reuse of the organic solvents volatilized into a specialized air conditioning unit. Fully as important as humidity in controlling hydrolysis is temperature. These two factors are interdependent. If the humidity is low, it may be satisfactory or advisable to apply some external heat. Generally, however, simple room temperature conditions will be adequate but once the film becomes dried to the point where it is not at all tacky, that is, when most of the organic solvent is evaporated off, then it is possible and often preferred to hydrolyze and heat-cure the film at substantially elevated temperatures, such as subjecting the substantially solvent-free films to hydrolysis and to heating for a few minutes at, say, from 100° C. to 400° C. For some uses, such as where particularly hard films are desired, such curing advantageously effects removal of any residual alkoxy groups which room temperature hydrolysis has not driven off and further condenses the hydroxyl groups. In many cases prolonged exposure to the atmosphere will be equivalent to the application of heat. In commercial operations, however, speed is desired and heating is justified. One particularly useful application of the films of this invention employing the adhesion promotion characteristics concerns the preparation of a wide variety of laminated structures. The general procedure for preparing these laminates is to first coat the surface of a solid material with the metal ester. The metal ester is then hydrolyzed and polymerized on this surface by exposure to water vapor. The polyoxide films produced are then coated with the third member of the laminated structure which is applied in initially fluid form. Within the range of operability of this invention one may choose sets of conditions designed to give optimum film clarity and adhesion. These conditions may vary with the ester or solvent used and vice versa. In general, the assurance of clear films is enhanced by lower humidity, slow hydrolyses, hydrophobic solvent, thinner polyoxide film, and higher molecular weight of the metal ester.

An example of this lamination is found in the application of new paint to old painted surfaces. It is well known that the adhesion of enamel paint to an aged enamel paint coating is difficult to obtain. However, if the aged paint is first coated with a layer of the polyoxide film of this invention, exceptionally good adhesion of the new paint layer is obtained. In carrying out this coating operation the old paint surface may be cleaned with a suitable solvent. Then, for example, a solution of tetraisopropyl titanate containing about 2% by weight of the ester is spread over the surface of the old paint where it is allowed to hydrolyze and polymerize through contact with the atmospheric moisture. Depending upon the temperature and humidity, the polyoxide film will be ready to receive the new paint coat in from 4 to 24 hours. The new paint is then applied as usual and any resulting laminar coating has improved properties of durability.

This new laminating procedure is especially advantageous when applying protective or decorative coatings to metals. It is well known, for example, that new aluminum surfaces do not bond well to paints. Excellent adhesion, however, is obtained when the hydrolyzed polyester film according to this invention is first applied to the aluminum. Another product of this invention is copper wire first coated with the hydrolyzed film and then coated with molten polythene. Upon cooling, the polythene hardens to form an adherent, durable insulating coating. This procedure is particularly advantageous when applied to motor windings where thin insulating coatings are desired. Still another useful application of this procedure is in the preparation of electronic condensers described in Example IV. Laminated safety glass may be considerably improved by first coating the glass surface with this hydrolyzed ester film. In a specific instance, the glass plates are coated on one side with a dilute solution of tetrabutyl zirconate. After evaporation of the solvent and hydrolysis and polymerization of the residual ester film, the two treated surfaces of two glass plates are pressed against either side of a sheet of a polybutyral resin such as Butacite. Sufficient heat is then applied to the assembly during pressure to at least partially fluidize the Butacite with the result that an unusually strongly bonded laminate is obtained. A poly zirconium oxide film is preferable in this case in order to avoid some discoloration which sometimes occurs when using titanium esters. Many other similar plastic resins may be used in preparing laminates of this type which may be of course extended to fields where transparency is not an objective.

The adherent films of this invention have been found to be amorphous when examined for crystallinity prior to heat treatment. Films applied to metal may be heated or baked at high temperatures without a loss of the continuous character and then one can find that the titanium oxide film exhibits a crystalline pattern when examined by X-ray method.

The improved type of laminate made possible by this invention comprises a system of bonded layers wherein a first solid material is bonded to a second solid material by means of an interposed layer not more than one micron thick formed by the in-situ, water vapor hydrolysis and polymerization of a layer of a tetra-ester of a Group IV—A metal, while having present in said layer not more than a minor amount of a volatile solvent for said ester, the organic groups of said tetraester containing not more than 8 carbons per group, and said second solid material is a hardenable substance applied to said interposed layer subsequent to its hydrolytic formation in at least a partially fluid state and thereafter hardened. In these laminates the so-called solid materials may be plastic solids or even soft solids such as rubber or textile materials, so long as they are not in a true fluid state. The hardenable second member may be a thermoplastic solid rendered fluid, at least on the surface to be bonded, during the laminating process which usually employs pressure to contact the layers firmly. The molten phase penetrates or otherwise thoroughly contacts the polyoxide bonding film and then solidifies on cooling to a remarkably strong bond. Similarly, the second layer may be applied as a thermosetting liquid and subsequently baked to a solid layer. Also, the general class of polymeric liquid substances such as the drying oils, paints, lacquers, and acrylic monomers may be applied in the fluid state and hardened by the usual techniques of heating, air drying, radiation polymerization, etc.

I claim as my invention:

1. A method of coating a solid surface with an insoluble, transparent, flexible, adherent polymeric oxide film not more than one micron thick, which comprises applying to said surface a layer of a hydrolyzable organic ester containing from 1 to 8 carbon atoms per organic radical of a metal from the group consisting of titanium and zirconium containing from about .0003 to .0375 gram molecule of ester per square meter of said surface, and contacting the applied ester layer, while having present therein not more than a minor amount of a volatile solvent for said ester, with water vapor until substantial hydrolysis and polymerization of said ester on said surface is effected.

2. A transparent, flexible adherent film supported on a solid surface comprising the hydrolysis product of an organic ester containing not more than 8 carbon atoms per organic radical of a metal from the group consisting of titanium and zirconium, said film being not more than one micron thick, substantially insoluble in organic solvents and water, containing not more than one of the original organic groups per metal atom, and containing not more than .0375 gram molecule of metal oxide per square meter.

3. A transparent, flexible adherent film supported on a solid surface comprising the hydrolysis product of a titanic acid ester having the formula $(RO)_4Ti$ wherein R is an alkyl radical containing from 1–8 carbon atoms, said film being not more than one micron thick, substantially insoluble in organic solvents and water, and containing not more than .0375 gram molecule of titanium oxide per square meter.

4. A clear, transparent, flexible, adherent film supported on a solid surface comprising the hydrolysis product of butyl titanate, said film being substantially insoluble in organic solvents, not more than one micron thick, and containing from .0003 to .0375 gram molecule $TiO_2$ per square meter.

5. A clear, transparent, flexible, adherent film supported on a solid surface comprising the hydrolysis product of ethyl titanate, said film being substantially insoluble in organic solvents, not more than one micron thick, and containing from .0003 to .0375 gram molecule $TiO_2$ per square meter.

6. A clear, transparent, flexible, adherent film supported on a solid surface comprising the hydrolysis product of ethyl-hexyl titanate, said film being substantially insoluble in organic solvents, not more than one micron thick, and containing from .0003 to .0375 gram molecule $TiO_2$ per square meter.

7. A method for coating a solid surface with a clear, transparent, flexible, adherent and organic-solvent-insoluble film, comprising dissolving a titanic acid ester having the formula $(RO)_4Ti$, wherein R is an alkyl radical containing from 1–8 carbon atoms, to form a .01 to .3 molar solution in a volatile organic solvent, applying the resulting solution as a thin layer over said surface, and in amount ranging from .0003 to .0375 gram molecule of ester per square meter of surface, evaporating the solvent from the applied coating and contacting the applied ester layer, while having present therein not more than a minimum amount of said solvent, with water vapor to form a polyoxide coating not more than 1 micron thick.

8. A clear, transparent, flexible, adherent film supported on a solid surface comprising the hydrolysis product of isopropyl titanate, said film being substantially insoluble in organic solvents, not more than 1 micron thick, and containing from .0003 to .0375 gram molecule $TiO_2$ per square meter.

9. A clear transparent flexible adherent film supported on a solid surface which comprises the hydrolysis product of propyl titanate, said film being substantially insoluble in organic solvents, not more than one micron thick, and containing from .0003 to .0375 gram molecule of $TiO_2$ per square meter.

References Cited in the file of this patent

UNITED STATES PATENTS

| | | |
|---|---|---|
| 1,906,148 | Gardner | Apr. 25, 1933 |
| 1,906,149 | Gardner | Apr. 25, 1933 |
| 2,410,119 | McLeary | Oct. 29, 1946 |
| 2,511,171 | Mitchell | June 13, 1950 |
| 2,579,414 | Boyd | Dec. 18, 1951 |

FOREIGN PATENTS

| | | |
|---|---|---|
| 125,450 | Australia | Sept. 25, 1947 |

OTHER REFERENCES

Gardner et al.: American Paint and Varnish Manufacturer's Association, Circular No. 366, July 1930, pp. 329–334.

Kraitzer et al.: "Esters of Titanium," Paint Notes, Sept. 1947, pages 304 to 309.

Ind. and Eng. Chemistry, Oct. 1949, pages 7a and 10a.